United States Patent
Chenna et al.

(10) Patent No.: US 9,472,111 B2
(45) Date of Patent: Oct. 18, 2016

(54) AUGMENTED AIRCRAFT AUTOBRAKE SYSTEMS FOR PREVENTING RUNWAY INCURSIONS, RELATED PROGRAM PRODUCTS, AND RELATED PROCESSES

(71) Applicant: HONEYWELL INTERNATIONAL INC., Morristown, NJ (US)

(72) Inventors: Sreenivasa Kumar Chenna, Karnataka (IN); Nitinprasad S Nashimath, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/636,354

(22) Filed: Mar. 3, 2015

(65) Prior Publication Data

US 2016/0260335 A1 Sep. 8, 2016

(51) Int. Cl.

| | |
|---|---|
| *G08G 5/06* | (2006.01) |
| *G08G 9/02* | (2006.01) |
| *B60T 8/17* | (2006.01) |
| *G08G 5/00* | (2006.01) |
| *G01S 13/93* | (2006.01) |
| *G01S 7/04* | (2006.01) |

(52) U.S. Cl.
CPC .............. *G08G 5/06* (2013.01); *B60T 8/1703* (2013.01); *G08G 5/0013* (2013.01); *G08G 5/0021* (2013.01); *G08G 5/065* (2013.01); *G01S 2013/9335* (2013.01); *G01S 2013/9346* (2013.01)

(58) Field of Classification Search
CPC ...... G08G 5/065; G08G 5/04; G05D 1/0083; G05G 5/0021; G01S 13/93; G01S 2013/916; G01S 2013/9346; G01S 2013/9335
See application file for complete search history.

(56) References Cited

U.S. PATENT DOCUMENTS

| | | | | |
|---|---|---|---|---|
| 5,374,932 A | * | 12/1994 | Wyschogrod | G08G 5/065 342/29 |
| 8,620,493 B2 | | 12/2013 | Hughes et al. | |
| 2008/0195301 A1 | * | 8/2008 | Fabre | G08G 5/065 701/120 |
| 2013/0321169 A1 | | 12/2013 | Bateman et al. | |
| 2014/0278037 A1 | | 9/2014 | Choksi et al. | |
| 2015/0002316 A1 | * | 1/2015 | Sridhar | B64D 43/00 340/953 |

FOREIGN PATENT DOCUMENTS

| | | |
|---|---|---|
| EP | 2669706 A2 | 12/2013 |
| WO | 2008121530 A2 | 10/2008 |

OTHER PUBLICATIONS

Eveleigh, r., "D2.2-044—Detailed Operational Description—Runway Management—E1," SESAR (Single European Sky ATM Research), 2010.
Extended EP Search Report for Application No. EP 16156216.0-1756 dated May 7, 2016.

* cited by examiner

*Primary Examiner* — Khoi Tran
*Assistant Examiner* — Dale Moyer
(74) *Attorney, Agent, or Firm* — Lorenz & Kopf, LLP

(57) ABSTRACT

Augmented autobrake systems useful in preventing accidents related to runway incursions are provided, as are related processes and program products. In one embodiment, the augmented autobrake system is deployed on an aircraft and utilized in conjunction with a Runway Warning and Status Lights (RWSL) system. The augmented autobrake system includes a wireless receiver configured to receive runway status data from the RWSL system, an aircraft brake mechanism, and a controller coupled to the wireless receiver and to the aircraft brake mechanism. The controller is configured to: (i) identify when the aircraft is projected to enter a runway incursion zone based at least in part upon the runway status data and vector data pertaining to the aircraft, and (ii) when the aircraft is projected to enter a runway incursion zone, commanding the aircraft brake mechanism to stop the aircraft prior to entry into the runway incursion zone.

20 Claims, 5 Drawing Sheets

AUGMENTED AIRCRAFT AUTOBRAKE SYSTEMS FOR PREVENTING RUNWAY INCURSIONS, RELATED PROGRAM PRODUCTS, AND RELATED PROCESSES

TECHNICAL FIELD

The following disclosure relates generally to aircraft and, more particularly, to augmented aircraft autobrake systems useful in preventing runway incursions, as well as to related program products and processes.

BACKGROUND

A runway incursion occurs when an aircraft, ground vehicle, or personnel enters a runway without first obtaining proper authorization from Air Traffic Control (ATC). For example, a runway incursion may occur when an aircraft or ground vehicle crosses a runway presently designated for usage by another aircraft during takeoff. Runway incursions can create unsafe situations and should be prevented to the extent possible. Nonetheless, and despite considerable prevention efforts, runway incursions continue to occur at both towered and non-towered airports in the United States and around the world. The wholesale prevention of runway incursions is a highly challenging undertaking due to the variety of factors that can contribute to runway incursions. Such factors can include poor visibility conditions, such as fog, heavy rain, snow, and high sun glare. Other factors that can contribute to runway incursions include airport unfamiliarity, airport construction, heavy pilot workload, pilot distraction, pilot fatigue, and pilot-ATC miscommunications. As air traffic and airport congestion continues to increase, so too does the need to develop effective systems and processes for preventing runway incursions and accidents resulting therefrom.

BRIEF SUMMARY

Augmented or enhanced autobrake systems are provided, which are useful in preventing aircraft runway conflicts and the likelihood of accidents related thereto. In one embodiment, the augmented autobrake system is deployed on an aircraft and utilized in conjunction with a Runway Warning and Status Lights (RWSL) system. The augmented autobrake system includes a wireless receiver configured to receive runway status data from the RWSL system, an aircraft brake mechanism, and a controller coupled to the wireless receiver and to the aircraft brake mechanism. The controller is configured to: (i) identify when the aircraft is projected to enter a runway incursion zone based at least in part upon the runway status data and vector data pertaining to the aircraft, and (ii) when the aircraft is projected to enter a runway incursion zone, commanding the aircraft brake mechanism to stop the aircraft prior to entry into the runway incursion zone. In an embodiment, the aircraft vector data is obtained from an onboard Runway Advisory and Awareness System, such as the as the SMARTRUNWAY® system developed and commercially marketed by Honeywell International Inc.

Processes are further provided for avoiding runway incursions, which can be carried-out by the controller of an augmented autobrake system. In one embodiment, the process includes the step of determining, at the controller, whether the aircraft risks entry into a runway incursion zone based at least in part upon runway status data received from a RWSL system and vector data pertaining to the aircraft. When it is deterred that the aircraft risks entry into a runway incursion zone, commands are issued from the controller to an aircraft brake mechanism to slow or stop the aircraft prior to entry into the runway incursion zone.

Still further provided are program products for use in conjunction with augmented autobrake system deployed onboard an aircraft having an aircraft brake mechanism. The program product includes an autobrake control program and non-transitory, computer-readable media bearing the control program. The autobrake control program is configured to: (i) receive runway status data from a RSWL system, (ii) determine when the aircraft is projected to enter a runway incursion zone based upon the runway status data and vector data pertaining to the aircraft; and (iii) when determining that aircraft risks is projected to enter a runway incursion zone, commanding the aircraft brake mechanism to prevent the aircraft from entering the runway incursion zone.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
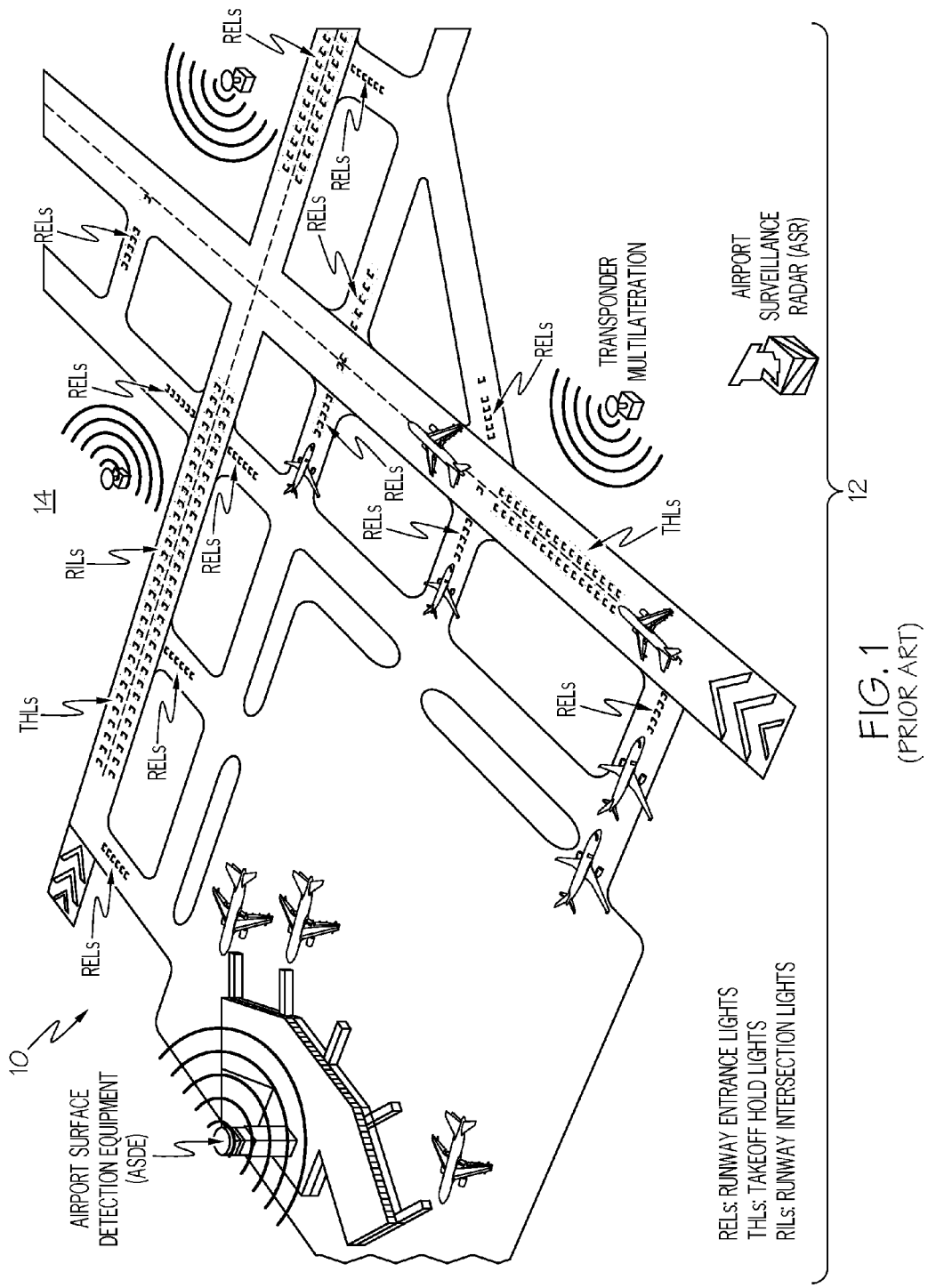
FIG. 1 is an isometric view of an airport equipped with a Runway Warning and Status Lights (RWSL) system, as illustrated in accordance with the teaching of prior art.

As noted in the foregoing section entitled "BACKGROUND," it is highly desirable to prevent the occurrence of runway incursions to the extent possible. To assist in this effort, the Federal Aviation Administration (FAA) has a developed an independent, ground-based warning system commonly referred to as a "Runway Warning and Status Lights" system or "RWSL" system. FIG. 1 is an isometric view of an airport 10 equipped with an exemplary RWSL system 12, as illustrated in accordance with the teachings of prior art. RWSL system 12 includes a relatively large number of runway status lights, which are strategically positioned at selected locations across the navigable surface 14 of airport 10 (referred to herein as "airport surface 14"). As labeled in FIG. 1, RWSL system 12 includes three general types of runway status lights: (i) Runway Entrance Lights (RELs), (ii) Runway Intersection Lights (RILs), and (iii) Take-Off Hold Lights (THLs). In addition to the runway status lights, RWSL system 12 also includes control logic (not shown) and Airport Surface Detection Equipment (ASDE), such as Airport Surface Detection Equipment Model-X (ASDE-X). In the illustrated example, ASDE includes control tower equipment, Airport Surveillance Radar (ASR), and a number of multilateration transponders positioned at different locations on airport surface 14. During operation of RWSL system 12, ASDE provides data to the control logic indicating the position and movement of traffic across airport surface 14, including runway occupancy. The control logic of RWSL system 12 executes an algorithm, which utilizes this data to determine the manner in which to control the runway status light in the below-described manner.

The RELs of RWSL system 12 are installed at runway/taxiway intersections across airport surface 14. During operation of RWSL system 12, the control logic of system 12 selectively illuminates RELs when determining that a particular runway is unsafe to enter based upon the data provided by the ASDE. When illuminated, the RELs adjacent a particular runway provide a visual alert to the pilot of an aircraft (or ground vehicle driver) that entry into the runway should be avoided. Similarly, the RILs of RWSL system 12 are positioned along runways at other potential intersections and are likewise illuminated red when the control logic of RWSL system 12 determines that a particular runway is unsafe to cross. Finally, the THLs of RWSL system 12 are located on the runways and positioned for pilot visibility from the take-off hold position of each runway. The control logic of RWSL system 12 causes the appropriate THLs to illuminate red when determining that an unsafe condition exists along the runway, such as the presence of an aircraft or vehicle on the runway. When illuminated, the THLs thus provide an intuitive visual indication to the pilot of an aircraft awaiting takeoff that the pilot should continue to hold at the take-off position. In this manner, RWSL system 12 can greatly reduce the likelihood of runway incursions and other runway conflicts occurring across airport surface 14 by selectively illuminating the runway status lights in the above-described manner. It will be noted that RWSL system 12 only indicates runway status and does not convey Air Traffic Control (ATC) clearance in any manner. Thus, when the runway status lights are not illuminated, a pilot is still required to obtain ATC clearance before crossing or taking-off from a particular runway.

While highly useful at reducing runway incursions, conventional RWSL systems remain limited in certain respects. A pilot is required to visually determine whether the runway status lights are illuminated and react accordingly to prevent the incursion. In poor visibility conditions, such as fog, heavy rain, snow, or harsh sun glare, it can be difficult for a pilot to accurately determine whether a particular group or cluster of runway status lights is illuminated. The pilot may thus inadvertently fail to respond to an illuminated group of runway status lights, and a runway incursion may occur. Even when visibility is not restricted, a runway incursion can still occur if a pilot fails to react promptly to illuminated runway status lights, whether due to pilot fatigue, pilot distraction, or another reason. The present inventors have thus recognized an ongoing need for the provision of aircraft systems that cooperate with existing RWSL systems to prevent or at least minimize the occurrence of runway incursions. In satisfaction of this need, the following describes embodiments of an augmented autobrake system that prevent or deter entry of an aircraft (A/C) into runway incursion zones; that is, areas or zones of an airport surface in which the A/C equipped with the autobrake system (referred to herein as the "ownship A/C") would risk colliding with another A/C or ground vehicle. A runway incursion zone may occur due to the impending or projected incursion of the ownship A/C onto a runway if forward progress of the A/C is not halted or slowed. Alternatively, a runway incursion zone may arise should the ownship A/C attempt to takeoff from a designated runway subject to an incursion due to, for example, the presence of another A/C or ground vehicle on the designated runway. When determining that the ownship A/C risks entry into such a runway incursion zone (i.e., the ownship A/C is projected to enter the runway incursion zone absent intervention of the autobrake system), the augmented autobrake system automatically slows or stops the A/C to prevent entry into the runway incursion zone. In so doing, the augmented autobrake system reduces reliance on human performance to minimize pilot workload and to provide an automated failsafe in the event that illuminated runway status lights are not properly heeded.

Autobrake systems have been known for some time and are commonly deployed onboard A/C to provide automatic braking functionalities during landing and/or rejected takeoff. During landing, a conventional autobrake system automatically engages the aircraft brake mechanism (e.g., brake hydraulics) to gradually bring the A/C to a stop after touchdown. Similarly, the autobrake system may control A/C braking in the event of a rejected takeoff. In this manner, conventional autobrake systems reduce pilot workload and can slow the A/C is highly controlled manner to reduce component wear and provide uniform deceleration. Additionally, in certain cases, the autobrake system may enable a pilot to adjust the abruptness with which the system applies the brake mechanism by, for example, selection of intensity settings utilizing the aircraft instrument panel. Embodiments of the augmented autobrake system described herein can perform such traditional functions, but further provide the added or "augmented" functionality of automatically engaging the aircraft brake mechanism to prevent entry of the ownship A/C into a runway incursion zone, as described below.

Advantageously, the augmented autobrake system can be realized or implemented in at least some embodiments through a simple software upgrade. Such a software-based implementation may be possible in instances wherein the ownship A/C is equipped with a conventional autobrake system and further includes a runway navigation system having the ability to track movement of the A/C with respect to runways and taxiways provided on an airport surface. Such runway navigation systems include the Runway Awareness and Advisory System (RAAS) developed and commercially marked by the assignee of the present application, Honeywell International Inc., currently headquartered in Morristown, N.J. The assignee has also released an upgrade to the RAAS system referred to as "SMARTRUNWAY®," which improves situational awareness by providing timely aural advisories and possible graphical alerts to the flight crew advising of A/C position during taxi, takeoff, final approach, landing, and rollout.

Figure 2:
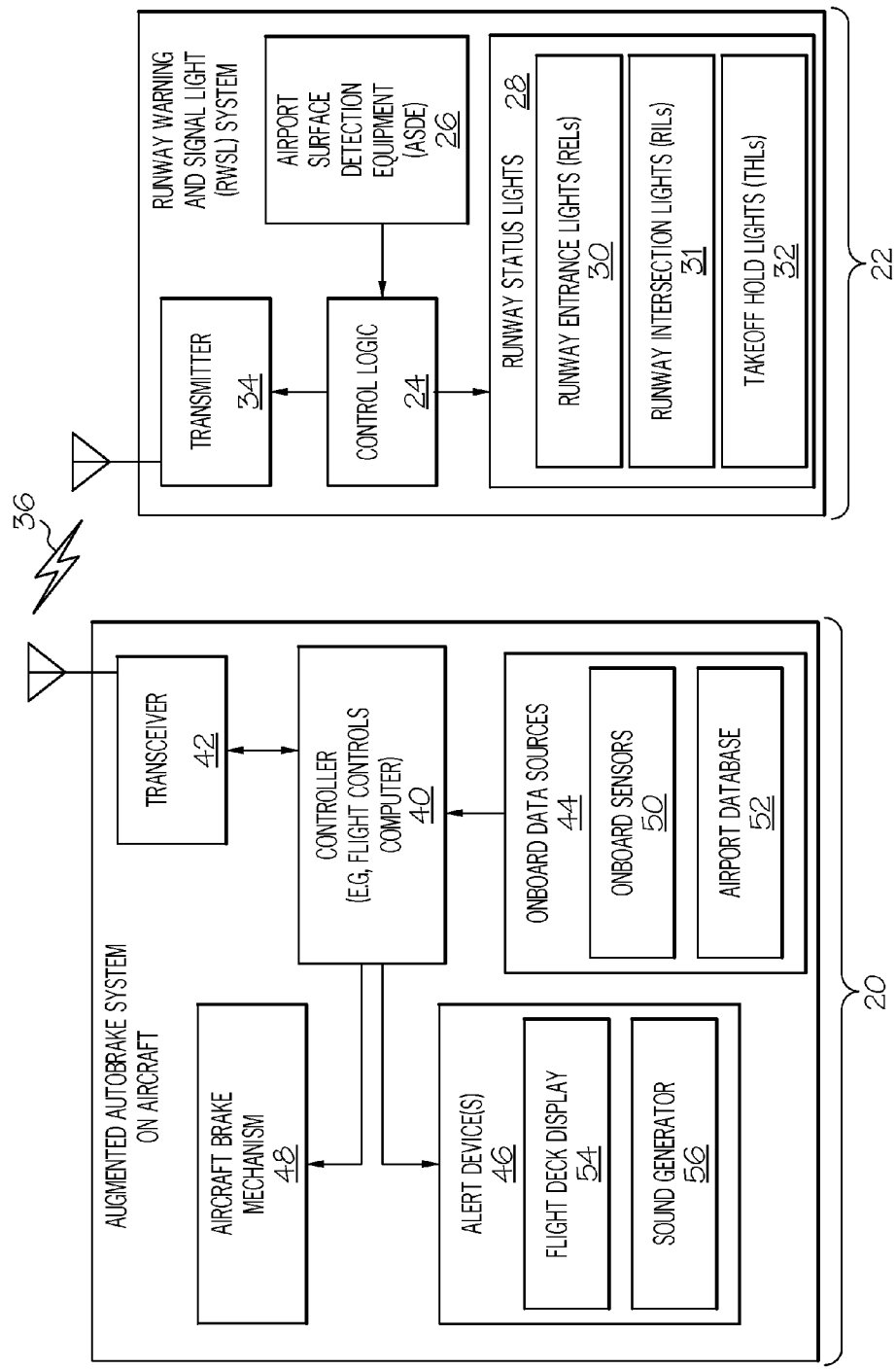
FIG. 2 is a block diagram of an augmented autobrake system and a RWSL system, as illustrated in accordance with an exemplary embodiment of the present invention.

FIG. 2 provides a block diagram of an augmented autobrake system 20 deployed onboard an aircraft, as illustrated in accordance with an exemplary embodiment of the present invention. FIG. 2 also provides a block diagram of an RWSL system 22, which can be utilized in conjunction with RWSL system 22 and which is similar RWSL system 12 shown in FIG. 1. RWSL system 22 is similar to RWSL system 12

(FIG. 1) in the sense that system 22 includes the following components: (i) control logic 24, (ii) ASDE 26, which provides control logic 24 with data regarding ground traffic and runway occupancy, and (iii) runway status lights 28, which are selectively illuminated by control logic 24 to provide visual indications of runway status in the above-described manner. Furthermore, as generically indicated in FIG. 2, runway status lights 28 include RELs 30, RILs 31, and THLs 32. In contrast to conventional RWSL systems, such as system 12 shown in FIG. 1, RWSL system 22 further includes a transmitter 34, which is utilized by control logic 24 to wirelessly transmit runway status data to a wireless receiver included within augmented autobrake system 20 (indicated in FIG. 2 by symbol 36). The "runway status data" can include any information from which autobrake system 20 can identify runway incursion zones, as described more fully below. For example, such information can include data regarding the present location and movement of other aircraft and ground vehicles across an airport surface, such as surface 14 shown in FIG. 1. Additionally or alternatively, such information can include a relatively simple indication of which, if any, runway status lights 28 are currently illuminated. This data may be transmitted from RWSL system 22 via transmitter 34 at a predetermined refresh rate of, for example, 0.1 second intervals to provide autobrake system 20 with updated traffic/runway status information on a near "real-time" basis.

Augmented autobrake system 20 includes the following components, each of which may be comprised of multiple devices, systems, or elements: (i) a controller 40; (ii) a wireless receiver 42 coupled to an input of controller 40, (iii) a number of onboard data sources 44 coupled to one or more inputs of controller 40, (iv) one or more alert devices 46 coupled to one or more outputs of controller 40, and (v) an aircraft brake mechanism 48 coupled to an output of controller 40. As indicated in FIG. 2, receiver 42 is preferably implemented as a transceiver and is thus referred to as "transceiver 42" hereafter. The lines connecting the components of augmented autobrake system 20 denote operative connections, which can be implemented as hardwire or wireless connections utilizing known aircraft infrastructure connections. In practice, augmented autobrake system 20 and the ownship A/C will typically include various other devices and components for providing additional functions and features, which are not shown in FIG. 2 and will not be described herein to avoid unnecessarily obscuring the invention. Furthermore, although augmented autobrake system 20 is schematically illustrated as a single unit in FIG. 2, the individual elements and components of augmented autobrake system 20 can be implemented in a distributed manner using any number of physically-distinct and operatively-interconnected pieces of hardware or equipment.

Controller 40 itself can be implemented utilizing any suitable number of individual microprocessors, navigational equipment, memories, power supplies, storage devices, interface cards, and other standard components known in the art. In this respect, the controller 40 may include or cooperate with any number of software programs (e.g., autobrake control programs) or instructions designed to carry out the various methods, process tasks, calculations, and control functions described below. As described in more detail below, controller 40 obtains and processes current data indicative of the runway incursion zones and determines when aircraft brake mechanism 48 should be selectively actuated. As indicated in FIG. 2, controller 40 may assume the form of or be a part of a Flight Controls (FC) computer in at least some embodiments. Wireless transceiver 42 can assume any form suitable for receiving wireless signals containing runway status data from transmitter 34 of RWSL system 22 and will often be included in a larger communication or data link module. Finally, aircraft brake mechanism 48 can assume the form of any device that can be actuated by augmented autobrake system 20 to slow or stop the ownship A/C. In one embodiment, aircraft brake mechanism 48 is a wheel-based hydraulic brake system.

With continued reference to FIG. 2, onboard data sources 44 include one or more onboard sensors 50 and an airport database 52. During operation of augmented autobrake system 20, onboard sensors 50 provide controller 40 with data describing the current location, heading, and groundspeed of the ownship A/C (referred to herein as "vector data"). In certain embodiments, onboard sensors 50 may further provide controller 40 with other data, as well, such as information describing the weather and surface conditions of the runway surfaces. In practice, onboard sensors 50 may be realized using line replaceable units ("LRUs"), transducers, accelerometers, instruments, sensors, and other well-known devices. Onboard sensors 50 can also be contained within other systems, which, for the intent of this document, may be considered to be partially or wholly included in augmented autobrake system 20. Such systems may include, but are not limited to, a Flight Management System ("FMS"), an Inertial Reference System ("IRS"), and/or an Attitude Heading Reference System ("AHRS"). Furthermore, as previously indicated, the vector data and/or data regarding ground traffic is advantageously provided by a RAAS system, such as a SMARTRUNWAY® system, deployed onboard the ownship A/C in certain embodiments, in which case sensors 50 may be included in the RAAS system or provide data thereto. Airport database 52 is stored in a memory (not shown) and can include any store of information containing data describing the layout of airport surfaces, such as the runway locations and lengths (referred to herein generally as an "airport surface map"). In one embodiment, the airport database is included within a larger navigation database, such as an Enhanced Ground Proximity Warning System ("EGPWS") runway database.

Augmented autobrake system 20 further includes alert devices 46 in the form of a flight deck display (FDD) 54 and a sound generator 56. FDD 54 can be any image-generating device that operates in the cockpit of an aircraft and which is capable of providing the visual alerts described below. FDD 54 may be a stationary device affixed to the cockpit or, instead, a portable device carried into the aircraft cockpit, such as an Electronic Flight Bag (EFB). A non-exhaustive list of display devices suitable for use as FDD 54 includes cathode ray tube, liquid crystal, active matrix, and plasma display devices. In one embodiment, FDD 54 is a multi-function display (MFD). Similarly, sound generator 56 can be any device capable of generating or annunciating the aural alerts described below. In further embodiments, augmented autobrake system 20 may only include one of FDD 54 and sound generator 56, may include a different type of alert device (e.g., a haptic device), or may not include any alert devices.

Figure 3:
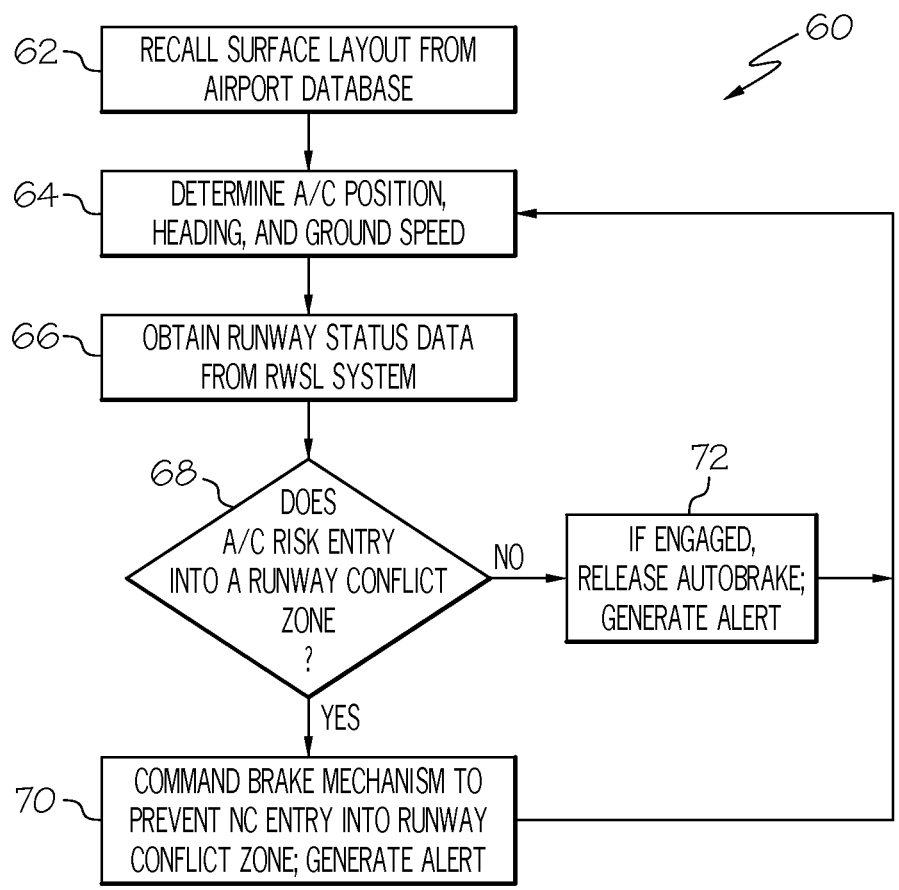
FIG. 3 is a flowchart setting-forth a master process that can be performed by the augmented autobrake system shown in FIG. 2 to prevent the aircraft from entering into a runway incursion zone.

FIG. 3 is a flowchart illustrating an exemplary master process 60 that may be performed by controller 40 of augmented autobrake system 20 (FIG. 2) to determine when selective engagement of aircraft brake mechanism 48 (FIG. 2) is warranted to prevent or at least deter entry of the ownship A/C into a runway incursion zone. Referring to FIG. 3 in conjunction with FIG. 2, exemplary process 60 commences with recalling an airport layout or surface map from airport database 52 (FIG. 2) for the airport at which the ownship A/C is presently located (STEP 62, FIG. 3). Further, at STEP 64 (FIG. 3), controller 40 determines the vector data of the ownship A/C, including position, heading, and ground speed. Still further, at STEP 66, controller 40 obtains runway status data from RWSL system 22 (STEP 66, FIG. 3). As indicated above, the runway status data can be relatively comprehensive information describing vector data for all air traffic operating on the runway surface, along with runway and taxiway occupancy. Additionally or alternatively, the runway status data can be a relatively simple indication of which, if any, runway status lights are currently illuminated. Utilizing this information, controller 40 is able to determine whether the A/C risks entry into a runway incursion zone (STEP 68, FIG. 3). For example, controller 40 may utilize the data gathered at STEPS 62, 64, and 66 to project the A/C position at a predefined future point and determine whether the future A/C position will coincide with any runway incursion zones or areas in which a collision could potentially occur with another A/C or ground vehicle. In this regard, at STEP 68, controller 40 may identify one or more types of runway incursion zones, such as the predicted incursion of the ownship A/C onto an active runway when taxying, as described more fully below in conjunction with FIG. 4; or when the ownship A/C is in the process of takeoff from a runway subject to an incursion (e.g., due to occupancy by another A/C, a ground vehicle, or other object), as described more fully below in conjunction with FIG. 5.

If, during STEP 68 of exemplary process 60 (FIG. 3), controller 40 determines that the A/C risks entry into a potential conflict situation, controller 40 advances to STEP 70 and commands aircraft brake mechanism 48 to stop or slow the A/C prior to entry into the runway incursion zone. In this manner, augmented autobrake system 20 may effectively prevent the ownship A/C from crossing any RELs in the path of the A/C while the RELs remain illuminated. Additionally, controller 40 may generate an alert during automatic application of brake mechanism 48. This alert be a visual alert generated on FDD 54 (FIG. 2), such as a text message reading "AUTOBRAKE ENGAGED." Additionally or alternatively, the alert may be an aural message announcing "AUTOBRAKE ENGAGED." After generation of the alert, controller 40 may return to STEP 62 and master process 60 may repeat. In certain cases, controller 40 may also generate an aural or visual alert prior to application of aircraft brake mechanism 48 when determining that the A/C is approaching a runway incursion zone. For example, in such a case, an aural warning can be annunciated utilizing sound generator 56 (FIG. 2) stating "UNSAFE CONDITION AHEAD; AUTOBRAKE WILL SOON ENGAGE."

If, during STEP 68, controller 40 instead determines that A/C does not risk entry into a runway incursion zone, controller 40 may progress to STEP 72. During STEP 72, controller 40 may release aircraft brake mechanism 48 if previously automatically engaged; it being noted that the autobrake system can also typically be manually overridden by application of the brake pedals. Additionally, controller 40 may also generate a message visually conveying or audibility conveying that the autobrake has been released. Furthermore, it is preferred that the alert further advises the aircrew that ATC clearance is still required before the A/C may proceed to cross or takeoff from a runway. As a specific example, controller 40 may drive sound generator 56 to generate the following aural message during STEP 72 of master process 60 (FIG. 3): "AUTOBRAKE RELEASED; ATC CLEARANCE REQUIRED BEFORE PROCEEDING." Controller 40 may then return to STEP 64, and master process 60 may repeat.

Figure 4:
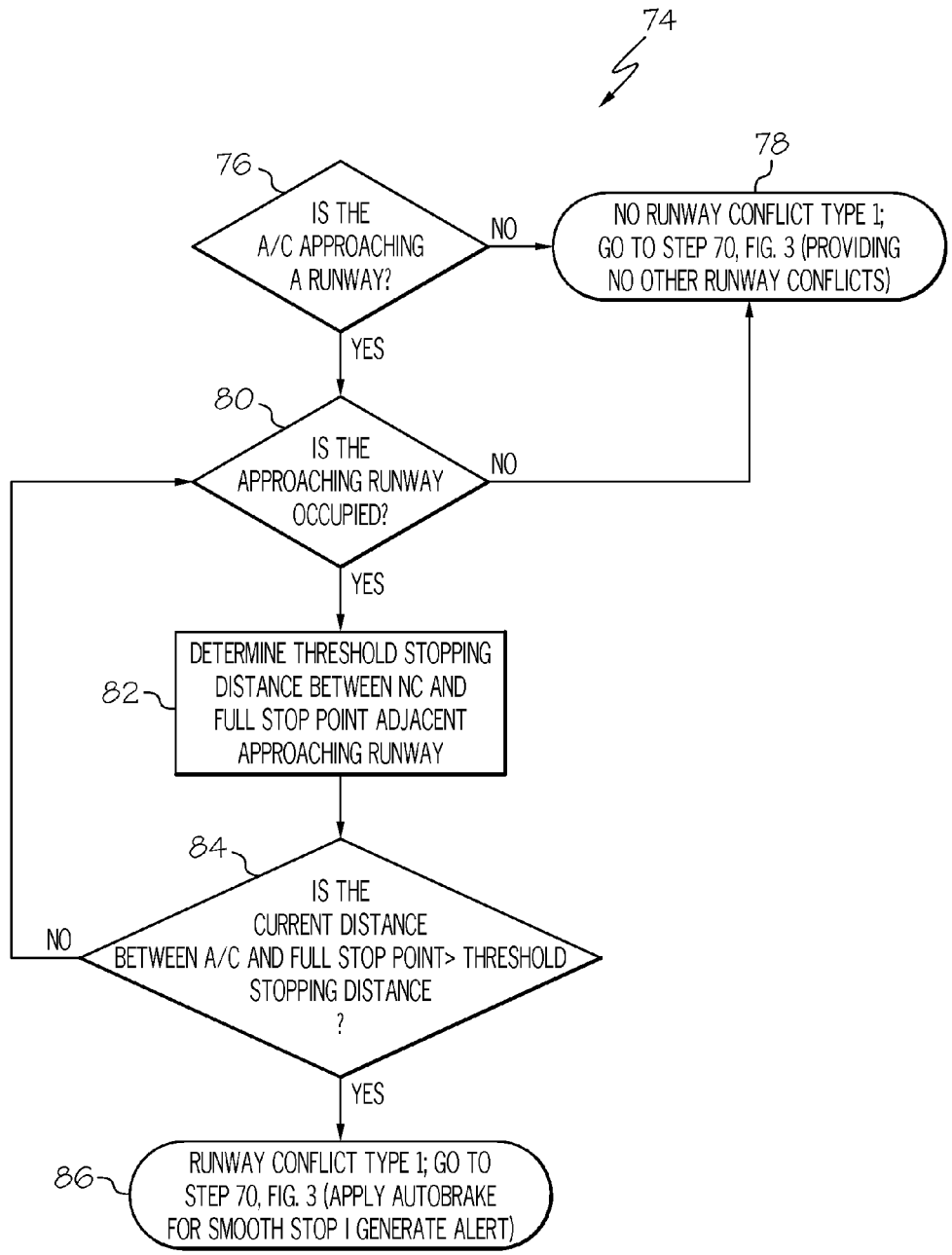
FIG. 4 is a flowchart setting-forth a first sub-process that can be performed during the master process (FIG. 3) to prevent the aircraft from entering a first type of runway incursion zone arising from an unauthorized incursion of the aircraft onto a runway.

As noted above, controller 40 can check for multiple different types of runway incursion zones during STEP 68 of exemplary process 60 (FIG. 3). For example, one runway incursion zone that may be evaluated by controller 40 is the possibility of a runway incursion by the ownship A/C onto a runway occupied by another aircraft. FIG. 4 illustrates an exemplary sub-process 74 that can be performed by controller 40 during STEP 68 (FIG. 3) to determine whether such a runway incursion zone exists ahead of the ownship A/C (referred to herein as a "Type 1 Runway Conflict"). Referring first to STEP 76 of sub-process 74, controller 40 first determines whether the ownship A/C is approaching a runway utilizing the data gathered during STEPS 62 and 64 of master process 60 (FIG. 3). If determining that the ownship A/C is not approaching a runway, controller 40 concludes that a Type 1 Runway Conflict does not exist (STEP 78, FIG. 4). Controller 40 then advances to STEP 72 of master process 60 (FIG. 3) providing that no other runway incursion zones exist.

If, during STEP 76, controller 40 determines that the ownship A/C is approaching a runway, controller 40 next establishes whether the approaching runway is occupied (STEP 80, FIG. 3). Controller 40 determines whether the approaching runway is occupied based, at least in part, on the data obtained from RWSL system 22 (FIG. 2) during STEP 66 of master process 60 (FIG. 3). If the approaching runway is not occupied, controller 40 determines once again that a Type 1 Runway Conflict does not exist (STEP 78) and advances to STEP 72 of master process 60 (FIG. 3). Conversely, if determining that the approaching runway is occupied during STEP 80, controller 40 next calculates a threshold stopping distance between the ownship A/C and the approaching runway (STEP 82). The threshold stopping distance is the distance at which controller 40 first engages aircraft brake mechanism 48 (FIG. 2) to bring the A/C to a complete stop at a designated full stop point, which may be the edge of the approaching runway or, more preferably, a hold line or stop bar located on the intersecting taxiway on which the A/C is presently traveling. Controller 40 calculates the threshold stopping distance based upon a number of factors including the ground speed of the A/C and the location of the full stop point (e.g., taxiway hold line) with respect to the current A/C position. In preferred embodiments, controller 40 also considers the airport surface conditions, such as whether ice or water is present on the taxiway, when calculating the threshold stopping distance.

Next, at STEP 84, controller 40 determines whether the current distance between the ownship A/C and the full stop point is greater than the threshold stopping distance calculated during STEP 82 of exemplary sub-process 74 (FIG. 4). If the present distance between the A/C and the full stop point exceeds the threshold stopping distance, application of aircraft brake mechanism 48 (FIG. 2) is not yet warranted and controller 40 returns to STEP 80. Controller 40 will thus continually cycle through STEPS 80, 82, and 84 until such time as the approaching runway is no longer occupied (in which case, the query presented at STEP 80 is answered in the negative) or until such time as the distance separating the A/C and the full stop point is equal to or slightly less than the threshold stopping distance. Additionally, as STEP 82 is performed at each iteration, the threshold stopping distance can be adjusted, as appropriate, to reflect dynamically-changing conditions, such runway surface conditions. When it is determined that the distance separating the A/C and the full stop point is equal to or less than the threshold stopping distance, controller 40 concludes that a Runway Conflict Type 1 is impending (STEP 86, FIG. 4) and advances to STEP 70 of master process 60 (FIG. 3). Accordingly, and as indicated in FIG. 4, controller 40 commands aircraft brake mechanism 48 to provide a smooth or gradual stop over the calculated braking distance and an alert may be generated. After brining the ownship A/C to a full stop, controller 40 then returns to STEP 62 and repeat master process 60. In this manner, controller 40 and, more generally, autobrake system 20 automatically slows or stops the A/C prior to entry into an occupied runway thereby reducing the likelihood of runway incursions.

Figure 5:
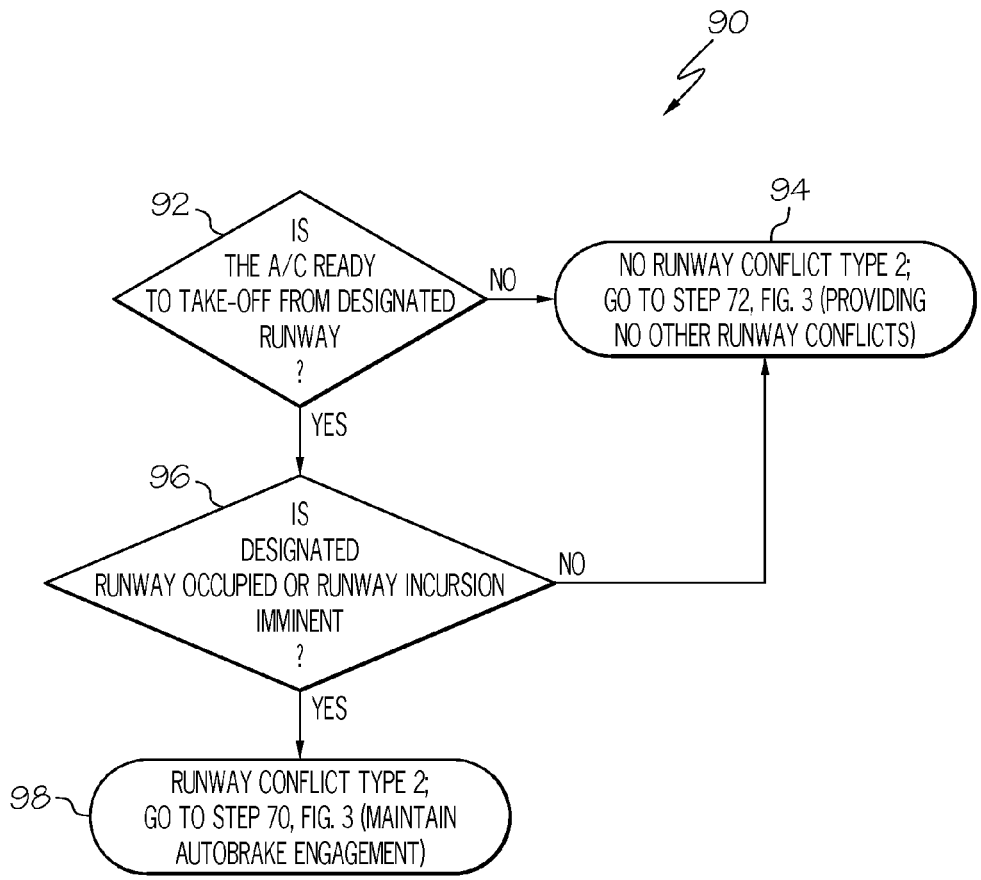
FIG. 5 is a flowchart setting-forth a second sub-process that can be performed during the master process (FIG. 3) to prevent the aircraft from entering a second type of runway incursion zone arising from attempted takeoff of the aircraft from an occupied runway.

As previously stated, controller 40 may also check for other types of runway incursion zones during STEP 68 of master process 60 (FIG. 3). For example, controller 40 can check for a runway conflict of occurring when the ownship A/C is about to or pending takeoff from a runway occupied by another A/C, a ground vehicle, or other object. FIG. 5 illustrates a second exemplary sub-process 90 that can be performed by controller 40 during STEP 68 (FIG. 3) to determine whether the ownship A/C is pending takeoff from a designated runway that is occupied by another vehicle or that is subject to an imminent runway incursion (referred to herein as a "Runway Conflict Type 2"). Sub-process 90 (FIG. 5) can be performed in parallel with sub-process 74 (FIG. 4) during STEP 68, along with any other sub-processes executed to identify other types of runway conflicts that can be avoided or alleviated through the automatic application of the aircraft brakes. As indicated in FIG. 5, sub-process 90 may begin by first determining whether the ownship A/C is pending takeoff from a designated runway (STEP 92); that is, whether the A/C is ready and awaiting takeoff from the designated runway. This may be determined based upon the data obtained during STEPS 62 and 64 of master process 60 (FIG. 3), possibly along with data received from the cockpit indicating that the aircrew is readying the A/C for takeoff. If it is determined that the A/C is not pending takeoff, controller 40 (FIG. 2) concludes that a Runway Conflict Type 2 does not exist (STEP 94). Providing that no other runway incursion zones exist, controller 40 then advances to STEP 72 of master process 60 (FIG. 3) and releases the autobrake if engaged, as previously described.

If, during STEP 92, it is instead determined that the A/C is pending takeoff from a designated airport, controller 40 advances to STEP 96 of sub-process 92 (FIG. 5). At this step, controller 40 determines whether the designated runway is occupied or an imminent incursion into the runway is predicted. Controller 40 can make this determination based upon the data received during STEPS 62 and 66 of master process 60 (FIG. 3). With respect to whether a runway incursion is imminent, this can be determined based upon the vector data (current position, heading, and ground speed) of other A/C and ground vehicles relative to the designated runway. If it is determined that the designated runway is not occupied and an incursion into the runway is not imminent, controller 40 again concludes that a Runway Conflict Type 2 does not exist (STEP 94). Providing that no other runway incursion zones exist, controller 40 then advances to STEP 72 of master process 60 (FIG. 3). Alternatively, if determining that the designated runway is occupied or an incursion into the runway is imminent, controller 40 concludes a Runway Conflict Type 2 exists (STEP 98). Accordingly, controller 40 advances to STEP 70 of master process 60 (FIG. 3) during which controller 40 maintains engagement of the autobrake/aircraft brake mechanism 48 or initiates the brake mechanism 48 if not previously engaged. In so doing, autobrake system 20 prevents A/C takeoff until the designated runway is no longer occupied by another A/C or ground vehicle or otherwise subject to a runway incursion. Corresponding visual and/or aural alerts may also be generated, as previously described, in conjunction with engagement of the autobrake. In effect, augmented autobrake system 20 may prevent the ownship A/C from crossing any THLs in the path of the A/C while the THLs remain illuminated. In this manner, augmented autobrake system 20 decreases the likelihood of the ownship A/C colliding with another A/C, ground vehicle, or other object during takeoff in the unlikely event of a runway incursion.

When performing master process 60 (FIG. 3), controller 40 of augmented autobrake system 20 (FIG. 2) can also determine whether entry of the ownship A/C into a runway incursion zone is unavoidable despite automatic application of the aircraft brakes and, if so, transmit a corresponding alert to ATC and/or to any aircraft in the vicinity of the ownship A/C. More specifically, controller 40 may utilize the data gathered during STEPS 62, 64, and 66 of process 60 (FIG. 3) to determine whether a full stop of the ownship A/C is possible prior to incursion of the ownship A/C onto an occupied runway. If it is determined that a full stop of the ownship A/C cannot be achieved, controller 40 may cause transceiver 42 to send a Notice to Airmen (NOTAM) message to neighboring aircraft indicating that an incursion or intrusion onto a particular runway by the ownship A/C is imminent. The NOTAM message may identify the runway pending incursion and, perhaps, provide the identity of the ownship A/C. Additionally or alternatively, augmented autobrake system 20 (FIG. 2) may also transmit a similar alert message to ATC via transceiver 42. Such additional steps can be performed, for example, following STEP 84 of sub-process 74 (FIG. 4).

In addition to providing the autobrake functionality described above, augmented autobrake system 20 (FIG. 2) may also generate in-flight alerts in instances wherein it is determined that a runway at which the ownship A/C is scheduled to land in the near future is subject to or at risk of a runway incursion. Consider, for example, a first scenario wherein the ownship A/C is scheduled to land at a first runway, which crosses a second runway at which another aircraft is scheduled to land at approximately the same time. In this case, data from RWSL system 22 (FIG. 2), such as data indicating that RILs 31 located at the juncture of the crossing runways are currently illuminated, can be utilized to determine the potential runway incursion. Accordingly, controller 40 of augmented autobrake system 20 (FIG. 2) can generate one or more alerts within the cockpit of the ownship A/C (e.g., a visual alert generated on FDD 54 and/or an aural alert generated via sound generator 56) notifying the aircrew of the potential incursion. At the same time, augmented autobrake system 20 (FIG. 2) may also send an alert message to ATC via transceiver 42 describing the potential incursion. The pilot of the ownship A/C and the ATC can then determined whether a detour or hold is appropriate. Augmented autobrake system 20 (FIG. 2) may also generate in-flight alerts in other instances, as well. Consider further a second scenario wherein the ownship A/C is scheduled to land at a runway intersected by multiple taxiways. Augmented autobrake system 20 (FIG. 2) may receive data from RWSL system 22 (sent via transmitter 34) indicating the illumination status of the RILs 31 and RELs 30 bordering the runway at which the ownship A/C is scheduled to land. In the event that any of the runway status lights bordering the runway are not presently illuminated (that is, less than all of the runway status lights are illuminated), controller 40 of augmented autobrake system 20 (FIG. 2) can again generate one or more alerts within the cockpit of the ownship A/C (e.g., a visual alert and/or aural alert) notifying the aircrew of the increased risk of incursion onto the runway. Augmented autobrake system 20 (FIG. 2) may also send an alert message to ATC via transceiver 42 describing the potential incursion. Once again, the decision whether to detour, hold, or proceed with the scheduled landing can be left to the ATC and pilot of the ownship A/C.

The foregoing has thus provided embodiments of an augmented or enhanced autobrake system to reduces the likelihood of runway incursions and other runway conflicts. Notably, embodiments of the augmented autobrake system can leverage existing systems onboard an aircraft (e.g., conventional autobrake systems and runway advisory and awareness systems, such as the SMARTRUNWAY® system developed by the present assignee) to provide the unique functionality described above, while requiring little to no hardware modifications to an aircraft. In effect, runway safety and advisory systems currently deployed onboard aircraft may be augmented with RWSL data to effectively auto-control the aircraft brakes to avoid potential runway incursions. In certain embodiments, the augmented autobrake system identifies different types of runway incursion zones based upon runway status data obtained from an RWSL and onboard data sources, and controls the autobrake mechanism to prevent entry of the ownship A/C into the runway incursion zones. In a similar regard, embodiments of the autobrake system can control the autobrake mechanism to prevent the A/C from crossing any currently-illuminated runway status lights. While the foregoing exemplary embodiment was described above in the context of a fully functioning computer system (i.e., augmented autobrake system 20 shown in FIG. 2), those skilled in the art will recognize that the mechanisms of the present invention are capable of being distributed as a program product (i.e., an autobrake control program) and, furthermore, that the teachings of the present invention apply to the program product regardless of the particular type of non-transitory, computer-readable media (e.g., floppy disc, hard drive, memory card, optical disc, etc.) employed to carry-out its distribution.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. An augmented autobrake system deployed on an aircraft and utilized in conjunction with a Runway Warning and Status Lights (RWSL) system, the augmented autobrake system comprising:
    a wireless receiver configured to receive runway status data from the RWSL system;
    an aircraft brake mechanism; and
    a controller coupled to the wireless receiver and to the aircraft brake mechanism, the controller configured to:
        (i) identify when the aircraft is projected to enter a runway incursion zone based at least in part upon the runway status data and vector data pertaining to the aircraft, and (ii) when the aircraft is projected to enter a runway incursion zone, commanding the aircraft brake mechanism to stop the aircraft prior to entry into the runway incursion zone.

2. The augmented autobrake system of claim 1 further comprising onboard data sources coupled to the controller, the controller further configured to identify when the aircraft is projected to enter a runway incursion zone based at least in part upon data provided by the onboard data sources describing the position, heading, and ground speed of the aircraft on an airport surface.

3. The augmented autobrake system of claim 2 wherein the augmented autobrake system further comprises an airport database coupled to the controller, and wherein the controller is configured to determine when the aircraft is projected to enter a runway incursion zone by:
    establishing whether the aircraft is approaching a runway based upon at least in part on an airport surface map recalled from the airport database; and
    if establishing that the aircraft is approaching a runway, determining whether the runway is currently occupied.

4. The augmented autobrake system of claim 3 wherein, after determining the approached runway is occupied, the controller is further configured to:
    determine a threshold stopping distance to a taxiway hold line adjacent the approached runway based, at least in part, on the ground speed of the aircraft; and
    if the approached runway remains occupied when the distance between the aircraft and the taxiway hold line is equal to or less than the threshold stopping distance, engage the aircraft brake mechanism to bring the aircraft to a gradual stop at the taxiway hold line.

5. The augmented autobrake system of claim 4 wherein the controller is further configured to receive data describing the current runway surface conditions and to adjust the threshold stopping distance based upon the current runway surface conditions.

6. The augmented autobrake system of claim 1 wherein the controller is configured to:
    determine whether the aircraft is pending takeoff from a runway;
    if the aircraft is pending takeoff from a runway, determine whether the runway is occupied; and
    command the aircraft brake mechanism to prevent aircraft takeoff until the runway is no longer occupied.

7. The augmented autobrake system of claim 1 wherein the data received from the RWSL system describes which, if any, runway status lights of the RWSL system are currently illuminated, and wherein the controller is configured to selectively engage the aircraft brake mechanism to prevent the aircraft from crossing any currently-illuminated runway status lights.

8. The augmented autobrake system of claim 1 further comprising an alert device, and wherein the controller is further configured to generate an alert utilizing the alert device indicating when the aircraft brake mechanism has been engaged by the controller.

9. The augmented autobrake system of claim 1 further comprising an alert device, and wherein the controller is further configured to generate an alert utilizing the alert device indicating when the aircraft brake mechanism has been released by the controller and further advising that Air Traffic Control clearance is required before the aircraft can proceed.

10. The augmented autobrake system of claim 1 further comprising an alert device, and wherein the controller is further configured to generate an alert utilizing the alert device when the aircraft is projected to enter a runway incursion zone.

11. The augmented autobrake system of claim 1 further comprising a transceiver in which the receiver is included, and wherein the controller is further configured to issue a Notice to Airmen alert via the transceiver if determining that entry of the aircraft into the runway incursion zone is unavoidable despite application of the aircraft brakes.

12. The augmented autobrake system of claim 1 further comprising an alert device, and wherein the controller is further configured to:
determine whether a runway at which the aircraft is scheduled to land is subject to a runway incursion based, at least in part, on the runway status data received from the from the RWSL system; and
if determining that the runway at which the aircraft is scheduled to land is subject to a runway incursion, generate an alert utilizing the alert device.

13. The augmented autobrake system of claim 1 further comprising an alert device, and wherein the controller is further configured to:
determining the illumination status of runway status lights bordering a runway at which the aircraft is scheduled to land based at least in part upon the runway status data received from the from the RWSL system; and
if determining that not all of the runway status lights bordering the runway at which the aircraft is scheduled to land are illuminated, generate an alert utilizing the alert device.

14. A method carried-out by a controller of an augmented autobrake system deployed onboard an aircraft, the method comprising:
at the controller, determining whether the aircraft risks entry into a runway incursion zone based at least in part upon runway status data received from a Runway Warning and Status Lights (RWSL) system and vector data pertaining to the aircraft; and
when determining that the aircraft risks entry into a runway incursion zone, issuing commands from the controller to an aircraft brake mechanism to slow or stop the aircraft prior to entry into the runway incursion zone.

15. The method of claim 14 wherein the aircraft is equipped with a Runway Advisory and Awareness System (RAAS), and wherein the method further comprises receiving the vector data from the RAAS.

16. The method of claim 14 wherein determining whether the aircraft risks entry into a runway incursion zone comprises determining whether the aircraft is projected to intrude into an occupied runway based at least in part upon runway status data received from the RWSL system, from the vector data, and from an airport surface map recalled from an airport database.

17. The method of claim 14 wherein determining whether the aircraft risks entry into a runway incursion zone comprises determining whether the aircraft is pending takeoff from a runway that is presently occupied.

18. A program product for use in conjunction with augmented autobrake system deployed onboard an aircraft having an aircraft brake mechanism, the program product comprising:
an autobrake control program adapted to:
receive runway status data from a Runway Status and Warning Lights (RSWL) system;
determine when the aircraft is projected to enter a runway incursion zone based upon the runway status data and vector data pertaining to the aircraft; and
when determining that the aircraft is projected to enter a runway incursion zone, commanding the aircraft brake mechanism to prevent the aircraft from entering the runway incursion zone; and
non-transitory, computer-readable media bearing the autobrake control program.

19. The program product of claim 18 wherein the autobrake control program is adapted to determine whether the aircraft is projected to enter runway incursion zone by determining whether the aircraft is projected to intrude into an occupied runway based at least in part upon runway status data received from the RWSL system, from the vector data, and from an airport surface map recalled from an airport database.

20. The program product of claim 18 wherein the autobrake control program is adapted to determine whether the aircraft is projected to enter runway incursion zone by determining whether the aircraft is pending takeoff from a runway that is presently occupied.

* * * * *